(12) United States Patent
Desoli et al.

(10) Patent No.: US 11,880,759 B2
(45) Date of Patent: Jan. 23, 2024

(54) VECTOR QUANTIZATION DECODING HARDWARE UNIT FOR REAL-TIME DYNAMIC DECOMPRESSION FOR PARAMETERS OF NEURAL NETWORKS

(71) Applicants: STMICROELECTRONICS S.r.l., Agrate Brianza (IT); STMicroelectronics International N.V., Geneva (CH)

(72) Inventors: Giuseppe Desoli, San Fermo Della Battaglia (IT); Carmine Cappetta, Battipaglia (IT); Thomas Boesch, Rovio (CH); Surinder Pal Singh, Noida (IN); Saumya Suneja, New Delhi (IN)

(73) Assignees: STMICROELECTRONICS S.r.l., Agrate Brianza (IT); STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/172,979

(22) Filed: Feb. 22, 2023

(65) Prior Publication Data
US 2023/0206032 A1  Jun. 29, 2023

Related U.S. Application Data

(63) Continuation of application No. 16/794,062, filed on Feb. 18, 2020, now Pat. No. 11,593,609.

(51) Int. Cl.
*G06N 3/045*  (2023.01)
*G06F 16/22*  (2019.01)
(Continued)

(52) U.S. Cl.
CPC ......... *G06N 3/045* (2023.01); *G06F 16/2282* (2019.01); *G06F 18/217* (2023.01);
(Continued)

(58) Field of Classification Search
CPC ............ G06N 3/04; G06N 3/063; G06N 3/08; G06N 3/0454; G06N 3/084; G06N 3/0445;
(Continued)

(56) References Cited

U.S. PATENT DOCUMENTS 5,189,665 A   2/1993  Niehaus et al.
5,506,815 A   4/1996  Hsieh et al.
(Continued)

FOREIGN PATENT DOCUMENTS

CN   101093577 A   12/2007
CN   101578590 A   11/2009
(Continued)

OTHER PUBLICATIONS

"CS 179 Lecture 4: GPU Compute Architecture," Slideshow Presentation, 2015, 29 pages.
(Continued)

*Primary Examiner* — Michael S Osinski
(74) *Attorney, Agent, or Firm* — Seed IP Law Group LLP

(57) ABSTRACT

Embodiments of an electronic device include an integrated circuit, a reconfigurable stream switch formed in the integrated circuit along with a plurality of convolution accelerators and a decompression unit coupled to the reconfigurable stream switch. The decompression unit decompresses encoded kernel data in real time during operation of convolutional neural network.

20 Claims, 6 Drawing Sheets

(51) Int. Cl.
*G06N 3/04* (2023.01)
*G06N 3/063* (2023.01)
*G06N 3/08* (2023.01)
*G06F 18/21* (2023.01)

(52) U.S. Cl.
CPC .............. *G06N 3/04* (2013.01); *G06N 3/063* (2013.01); *G06N 3/08* (2013.01)

(58) Field of Classification Search
CPC .... G06N 3/0481; G06N 3/0472; G06N 3/082; G06N 3/045; G06F 16/2282; G06F 18/217; G06K 9/6262; G06K 9/6267; H04N 19/117; H04N 19/176; H04N 19/119; H04N 19/124; H04N 19/13; H04N 19/136; H04N 19/172; H04N 19/186; H04N 19/90; G06T 9/002; G06T 3/4046; G06V 10/764; G06V 10/82
See application file for complete search history.

(56) References Cited

U.S. PATENT DOCUMENTS

| | | |
|---|---|---|
| 5,768,613 A | 6/1998 | Asghar |
| 5,996,058 A | 11/1999 | Song et al. |
| 6,011,779 A | 1/2000 | Wills |
| 6,668,290 B1 | 12/2003 | Nelson |
| 7,737,994 B1 | 6/2010 | Wasserman et al. |
| 7,782,873 B2 | 8/2010 | Sharma et al. |
| 7,840,403 B2 | 11/2010 | Mehrotra et al. |
| 8,131,659 B2 | 3/2012 | Xu et al. |
| 9,020,276 B2 | 4/2015 | Vigliar et al. |
| 9,294,097 B1 | 3/2016 | Vassiliev |
| 9,294,403 B2 | 3/2016 | Mejia et al. |
| 9,436,637 B2 | 9/2016 | Kommanaboyina |
| 9,652,390 B2 | 5/2017 | Gu et al. |
| 10,078,620 B2 | 9/2018 | Farabet et al. |
| 10,296,829 B2 | 5/2019 | Mostafa et al. |
| 10,394,929 B2 | 8/2019 | Tsai et al. |
| 10,417,364 B2 | 9/2019 | Boesch et al. |
| 10,417,560 B2 | 9/2019 | Henry et al. |
| 10,438,115 B2 | 10/2019 | Henry et al. |
| 10,452,605 B2 | 10/2019 | Wang et al. |
| 10,482,155 B2 | 11/2019 | Werner et al. |
| 10,546,211 B2 | 1/2020 | Shacham et al. |
| 10,552,222 B2 | 2/2020 | Wang et al. |
| 10,586,148 B2 | 3/2020 | Henry et al. |
| 10,643,129 B2 | 5/2020 | Chen et al. |
| 10,909,728 B1 | 2/2021 | Appalaraju et al. |
| 11,003,985 B2 | 5/2021 | Kim et al. |
| 11,334,768 B1 | 5/2022 | Brody |
| 11,388,416 B2 | 7/2022 | Habibian et al. |
| 11,520,561 B1 * | 12/2022 | Afzal ...................... G10L 15/14 |
| 11,531,873 B2 | 12/2022 | Boesch et al. |
| 2002/0145779 A1 | 10/2002 | Strasser et al. |
| 2003/0086421 A1 | 5/2003 | Awsienko et al. |
| 2004/0158623 A1 | 8/2004 | Avida et al. |
| 2005/0138582 A1 | 6/2005 | So et al. |
| 2005/0183055 A1 | 8/2005 | Herrera |
| 2005/0268070 A1 | 12/2005 | Baxter |
| 2010/0005238 A1 | 1/2010 | Jeddeloh et al. |
| 2010/0061726 A1 | 3/2010 | Barbarossa et al. |
| 2010/0077079 A1 | 3/2010 | Xu et al. |
| 2010/0115249 A1 | 5/2010 | Paltashev et al. |
| 2011/0029471 A1 | 2/2011 | Chakradhar et al. |
| 2012/0287344 A1 | 11/2012 | Choi et al. |
| 2012/0303932 A1 | 11/2012 | Farabet et al. |
| 2013/0156278 A1 | 6/2013 | Kim et al. |
| 2015/0046674 A1 | 2/2015 | Barry et al. |
| 2015/0170021 A1 | 6/2015 | Lupon et al. |
| 2015/0212955 A1 | 7/2015 | Easwaran |
| 2015/0261702 A1 | 9/2015 | Culurciello et al. |
| 2016/0092484 A1 | 3/2016 | Finkler |
| 2016/0094827 A1 | 3/2016 | Li et al. |
| 2016/0148004 A1 | 5/2016 | Bakke et al. |
| 2016/0179434 A1 | 6/2016 | Herrero Abellanas et al. |
| 2016/0217101 A1 | 7/2016 | Johns et al. |
| 2016/0344629 A1 | 11/2016 | Gray |
| 2016/0379109 A1 | 12/2016 | Chung et al. |
| 2016/0379115 A1 | 12/2016 | Burger et al. |
| 2017/0011006 A1 | 1/2017 | Saber et al. |
| 2017/0116495 A1 | 4/2017 | Nomura et al. |
| 2017/0262407 A1 | 9/2017 | Wang et al. |
| 2018/0032857 A1 | 2/2018 | Lele et al. |
| 2018/0046895 A1 | 2/2018 | Xie et al. |
| 2018/0046900 A1 | 2/2018 | Dally et al. |
| 2018/0046906 A1 | 2/2018 | Dally et al. |
| 2018/0076918 A1 | 3/2018 | Boduch et al. |
| 2018/0084253 A1 * | 3/2018 | Thiagarajan ......... H04N 19/625 |
| 2018/0113649 A1 | 4/2018 | Shafiee Ardestani et al. |
| 2018/0121796 A1 | 5/2018 | Deisher et al. |
| 2018/0129935 A1 | 5/2018 | Kim et al. |
| 2018/0157970 A1 | 6/2018 | Henry et al. |
| 2018/0189063 A1 | 7/2018 | Fleming et al. |
| 2018/0189229 A1 | 7/2018 | Desoli et al. |
| 2018/0189231 A1 | 7/2018 | Fleming, Jr. et al. |
| 2018/0189424 A1 | 7/2018 | Boesch et al. |
| 2018/0189641 A1 | 7/2018 | Boesch et al. |
| 2018/0189642 A1 | 7/2018 | Boesch et al. |
| 2018/0189981 A1 | 7/2018 | Singh et al. |
| 2018/0197084 A1 | 7/2018 | Kim et al. |
| 2018/0204110 A1 | 7/2018 | Kim et al. |
| 2018/0255385 A1 | 9/2018 | Djordjevic et al. |
| 2018/0336468 A1 | 11/2018 | Kadav et al. |
| 2018/0336469 A1 | 11/2018 | O'Connor et al. |
| 2019/0026626 A1 | 1/2019 | Du et al. |
| 2019/0244080 A1 * | 8/2019 | Li ........................... G06N 3/045 |
| 2019/0266479 A1 | 8/2019 | Singh et al. |
| 2019/0266485 A1 | 8/2019 | Singh et al. |
| 2019/0266784 A1 | 8/2019 | Singh et al. |
| 2019/0340488 A1 | 11/2019 | Fishel et al. |
| 2019/0340508 A1 | 11/2019 | Liu et al. |
| 2019/0392297 A1 | 12/2019 | Lau et al. |
| 2020/0092556 A1 | 3/2020 | Coelho et al. |
| 2020/0228840 A1 | 7/2020 | Fracastoro et al. |
| 2020/0272779 A1 | 8/2020 | Boesch et al. |
| 2020/0280717 A1 | 9/2020 | Li et al. |
| 2020/0293487 A1 | 9/2020 | Anderson et al. |
| 2020/0304802 A1 | 9/2020 | Habibian et al. |
| 2020/0304804 A1 | 9/2020 | Habibian et al. |
| 2020/0327367 A1 * | 10/2020 | Ma .............................. G06T 7/73 |
| 2020/0364288 A1 | 11/2020 | Wen et al. |
| 2021/0021823 A1 | 1/2021 | Na et al. |
| 2021/0073450 A1 | 3/2021 | Boesch et al. |
| 2021/0099710 A1 * | 4/2021 | Salehifar ................ H04N 19/46 |
| 2021/0125070 A1 | 4/2021 | Wang et al. |
| 2021/0125380 A1 | 4/2021 | Lee et al. |
| 2021/0150767 A1 | 5/2021 | Ikai et al. |
| 2021/0216752 A1 | 7/2021 | Trani et al. |
| 2021/0232407 A1 | 7/2021 | Liu |
| 2021/0319290 A1 | 10/2021 | Mills et al. |
| 2021/0397966 A1 | 12/2021 | Sun et al. |
| 2022/0027715 A1 | 1/2022 | Carrera et al. |
| 2022/0138992 A1 | 5/2022 | Wu et al. |
| 2023/0084985 A1 | 3/2023 | Boesch et al. |
| 2023/0206032 A1 * | 6/2023 | Desoli ................. G06F 16/2282 382/156 |
| 2023/0252298 A1 * | 8/2023 | Song ...................... G06N 3/045 706/20 |

FOREIGN PATENT DOCUMENTS

| | | |
|---|---|---|
| CN | 101739241 A | 6/2010 |
| CN | 105247821 A | 1/2016 |
| CN | 105659099 A | 6/2016 |
| CN | 105892989 A | 8/2016 |
| CN | 106951961 A | 7/2017 |
| CN | 109255429 A | 1/2019 |
| CN | 106228240 B | 9/2020 |
| EP | 1087533 A1 | 3/2001 |
| WO | 9602895 A1 | 2/1996 |
| WO | WO 2018120019 A1 | 7/2018 |

(56) References Cited

FOREIGN PATENT DOCUMENTS

| WO | WO 2019045883 A1 | 3/2019 |
|---|---|---|
| WO | WO 2019093234 A1 | 5/2019 |

OTHER PUBLICATIONS

Abdelgawad et al., "High Level Synthesis of Canny Edge Detection Algorithm on Zynq Platform," *International Journal of Computer, Electrical, Automation, Control and Information Engineering* 9(1):148-152, 2015.

Alawad et al., "Stochastic-Based Deep Convolutional Networks with Reconfigurable Logic Fabric," *IEEE Transactions on Multi-Scale Computing Systems* 2(4):242-256, 2016.

Albericio et al., "Bit-Pragmatic Deep Neural Network Computing," Oct. 20, 2016. (12 pages).

Boo et al., Compression of Deep Neural Networks with Structured Sparse Ternary Coding, *Journal of Signal Processing Systems* 91:1009-1019, Nov. 6, 2018.

Cavigelli et al., "Origami: A 803 GOp/s/W Convolutional Network Accelerator," *IEEE Transactions on Circuits and Systems for Video Technology* 27(11):2461-2475, 2017.

Cesur et al., "On an Improved FPGA Implementation of CNN-based Gabor-Type filters," *IEEE Transactions on Circuits and Systems—II Express Briefs* 59(11):815-819, 2012.

Chang et al., "Mitigating Asymmetric Nonlinear Weight Update Effects in Hardware Neural Network Based on Analog Resistive Synapse," *IEEE Journal on Emerging and Selected Topics in Circuits and Systems* 8(1):116-124, 2018.

Chen et al., "A High-Throughput Neural Network Accelerator," *IEEE Micro* 35(3):24-32, May 2015.

Chen et al., "DaDianNao: A Machine-Learning Supercomputer," 2014 47th Annual IEEE/ACM International Symposium on Microarchitecture, Dec. 13-17, 2014, Cambridge, United Kingdom, 14 pages.

Chen et al., "DianNao: A Small-Footprint High-Throughput Accelerator for Ubiquitous Machine-Learning," Proceedings of the 19th international conference on Architectural support for programming languages and operating systems (ASPLOS), 2014, pp. 269-283.

Chen et al., "Eyeriss: An Energy-Efficient Reconfigurable Accelerator for Deep Convolutional Neural Networks," 2016 IEEE International Solid-State Circuits Conference, Jan. 31-Feb. 4, 2016, San Francisco, CA, 3 pages.

Cheung, "The Cross Bar Switch," Downloaded on Sep. 3, 2019 from www.mathcs.emory.edu/-cheung/Courses/355/Syllabus/90-parallel/CrossBar.html.

Chi et al., "Prime: A Novel Processing-in-Memory Architecture for Neural Network Computation in ReRAM-Based Main Memory," Jun. 18-22, 2016, ACM/IEEE 43rd Annual International Symposium on Computer Architecture (ISCA), pp. 27-39.

Choudhary et al., "NETRA: A Hierarchical and Partitionable Architecture for Computer Vision Systems," *IEEE Transactions on Parallel and Distributed Systems* 4(10):1092-1104, 1993.

Choudhary, "Parallel Architectures and Parallel Algorithms for Integrated Vision Systems," Thesis, University of Illinois at Urbana-Champaign, Champaign, Illinois, 1989, 200 pages.

Conti et al., "A Ultra-Low-Energy Convolution Engine for Fast Brain-Inspired Vision in Multicore Clusters," *Automations & Test in Europe Conference & Exhibition*, Mar. 9-13, 2015, Grenoble, France, pp. 683-688.

Debole et al., "FPGA-Accelerator System for Computing Biologically Inspired Feature Extraction Models," *2011 Conference Record of the Forty Fifth Asilomar Conference on Signals, Systems and Computers (ASILOMAR)*, Nov. 6-9, 2011, Pacific Grove, California, pp. 751-755.

DehHon et al., "Stream computations organized for reconfigurable execution," *Microprocessors and Microsystems* 30(6):334-354, 2006.

Desoli et al., "14.1: A 2.9TOPS/W Deep Convolutional Neural Network SoC in FD-SOI 28nm for Intelligent Embedded Systems," *IEEE International Solid-State Circuits Conference (ISSCC)*, San Francisco, California, Feb. 5-9, 2017, pp. 238-239. (3 pages).

DiCecco et al., "Caffeinated FPGAs: FPGA Framework For Convolutional Neural Networks," arXiv:1609.09671, 8 pages, 2016.

Du et al., "ShiDianNao: Shifting Vision Processing Closer To The Sensor," *2015 ACM/IEEE 42nd Annual International Symposium on Computer Architecture (ISCA)*, Portland, Oregon, Jun. 13-17, 2015, pp. 92-104.

Dundar, "Learning from minimally labeled data with accelerated convolutional neural networks," Doctoral Thesis, Purdue University, West Lafayette, Indiana, 2016, 150 pages.

Extended European Search Report, dated May 18, 2018, for European Application No. 17196986.8-1221, 11 pages.

Extended European Search Report, dated May 18, 2018, for European Application No. 17197117.9-1221, 15 pages.

Extended European Search Report, dated May 23, 2018, for European Application No. 17197028.8-1221, 15 pages.

Extended European Search Report, dated May 7, 2018, for European Application No. 17197155.9-1221, 10 Pages.

Extended European Search Report, dated May 9, 2018, for European Application No. 17197096.5-1221, 12 Pages.

Gokhale et al., "A 240 G-ops/s Mobile Coprocessor for Deep Neural Networks (Invited Paper)," *The IEEE Conference on Computer Vision and Pattern Recognition (CVPR)* Workshop, Columbus, Ohio, Jun. 23-28, 2014, 6 pages.

Gong et al., "Compressing Deep Convolutional Networks using Vector Quantization," arXiv:1412.6115 [cs.CV], Dec. 2014, 10 pages.

Graf et al., "A Massively Parallel Digital Learning Processor," *Advances in Neural Information Processing Systems (NIPS)*, pp. 529-536, 2009.

Gray et al., "MOS Operational Amplifier Design—A Tutorial Overview," *IEEE Journal of Solid-State Circuits* SC-17(6):969-982, Dec. 1982.

Guo et al., "Angel-Eye: A Complete Design Flow for Mapping CNN onto Customized Hardware," 2016 IEEE Computer Society Annual Symposium on VLSI (ISVLSI), Jul. 11, 2016, pp. 24-29.

Gysel et al., "Hardware-Oriented Approximation of Convolutional Neural Networks." arXiv:1604.03168, 8 pages, 2016.

Huang et al., "A Vector-Quantization Compression Circuit With On-Chip Learning Ability for High-Speed Image Sensor," *IEEE Access* 5:22132-22143, 2017.

Huang, et al., "eCNN: A Block-Based and Highly Parallel CNN Accelerator for Edge Inference", MICRO-52, 2019, 14 pages.

Jagannathan et al., "Optimizing Convolutional Neural Network on DSP," IEEE International Conference on Consumer Electronics, Jan. 7-11, 2016, Las Vegas, Nevada, pp. 371-372.

Jain, "Parallel Processing With the TMS320C40 Parallel Digital Signal Processor," Texas Instruments, SPRA053, pp. 1-32, 1994 (34 pages).

Jin et al., "An Efficient Implementation of Deep Convolutional Neural Networks on a Mobile Coprocessor," *57th International Midwest Symposium on Circuits and Systems (MWSCAS)*, Aug. 3-6, 2014, College Station, Texas, pp. 133-136.

Koscielnicki, "nVidia Hardware Documentation," Release git, Dec. 16, 2016, 631 pages.

Krizhevsky et al., "ImageNet Classification with Deep Convolutional Neural Networks," 25th International Conference on Neural Information Processing Systems, Dec. 3-6, 2012, Lake Tahoe, Nevada, 9 pages.

Kurugöllü et al., "Advanced educational Parallel DSP system based on TMS320C25 Processors," *Microprocessors and Microsystems* 19(3):147-156, 1995.

LeCun et al., "Deep Learning Tutorial," Slideshow Presentation, 2013, 204 pages.

Lecun et al., "Deep Learning: Nature Review," Slideshow Presentation, 2016, 44 pages.

LeCun et al., "Gradient-Based Learning Applied to Document Recognition," *Proceedings of the IEEE* 86(11):2278-2324, Nov. 1998.

Lee et al., "Convolutional Neural Network Accelerator with Vector Quantization," IEEE International Symposium on Circuits and Systems (ISCAS), May 26, 2019, pp. 1-5.

(56) References Cited

OTHER PUBLICATIONS

Lee, "Deep Learning Methods for Vision," Slideshow Presentation, 2012, 102 pages.
Lei et al., "SCADIS: A Scalable Accelerator for Data-Intensive String Set Matching on FPGAs," IEEE TrustCom-BigDataSE-ISPA, Aug. 23-26, 2016, Tianjin, China, pp. 1190-1197.
Lenart, "Design of Reconfigurable Hardware Architectures for Real-time Applications," thesis, Lund University, Lund, Sweden, 2008, 195 pages.
Li et al., "A High Performance FPGA-based Accelerator for Large-Scale Convolutional Neural Networks," 1-9, 2016.
Lian, "A Framework for FPGA-Based Acceleration of Neural Network Inference with Limited Numerical Precision Via High-Level Synthesis With Streaming Functionality," Thesis, University of Toronto, Toronto, Ontario, Canada, 2016, 117 pages.
Liu et al., "Pruning of Winograd and FFT Based Convolution Algorithm," 1-7, 2016.
Lloyd "Least Squares Quantization in PCM," *IEEE Transactions on Information Theory IT-28*(2):129-137, 1982.
Matteucci, "Deep Learning—Introduction," Slideshow Presentation, 2015, 79 pages.
Meloni et al., "A High-Efficiency Runtime Reconfigurable IP for CNN Acceleration on a Mid-Range All-Programmable SoC," International Conference on ReConFigurable Computing and FPGAs (ReConFig), Nov. 30-Dec. 2, 2016, Cancun, Mexico, 8 pages.
Moctar et al., "Routing Algorithms for FPGAS with Sparse Intra-Cluster Routing Crossbars," 22nd International Conference on Field Programmable Logic and Applications (FPL), Aug. 29-31, 2012, Oslo, Norway, pp. 91-98.
Monson et al., "Implementing High-Performance, Low-Power FPGA-based Optical Flow Accelerators in C," 24th International Conference on Application-Specific Systems, Architectures and Processors (ASAP), Jun. 5-7, 2013, Washington, DC, 7 pages.
Nair et al., "Rectified Linear Units Improve Restricted Boltzmann Machines," Proceedings of the 27th International Conference on Machine Learning, Haifa, Israel, Jun. 21, 2010, 8 pages.
Nvidia, "NVIDIA's Next Generation CUDA Compute Architecture: Fermi™," Whitepaper, 2009, 22 pages.
Paulino, "Generation of Custom Run-time Reconfigurable Hardware for Transparent Binary Acceleration," dissertation, Faculdade de Engenharia da Universidade do Porto, Jun. 2016. (202 pages).
Porter et al., "Lucas-Kanade Optical Flow Accelerator," MIT 6.375, May 11, 2011, 22 pages.
Qin et al., "How Convolutional Neural Networks See the World—A Survey of Convolutional Neural Network Visualization Methods," *Mathematical Foundations of Computing* 1(2):149-180, 2018 (32 pages).
Qiu et al., "A Hardware Accelerator with Variable Pixel Representation & Skip Mode Prediction for Feature Point Detection Part of SIFT Algorithm," 2009 IAPR Conference on Machine Vision Applications, May 20-22, 2009, Yokohama, Japan, 4 pages.
Rahman et al., "Efficient FPGA Acceleration of Convolutional N•eural Networks Using Logical-3D Compute Array," *Design, Automation & Test in Europe Conference & Exhibition*, Mar. 14-18, 2016, Dresdon, Germany, pp. 1393-1398.
Roque et al., "Adapting the Sobel Edge Detector and Canny Edge Extractor for iPhone 3GS architecture," 17th International Conference on Systems, Signals and Image Processing, Jun. 17-19, 2010, Rio de Janeiro, Brazil, 4 pages.
Sedcole, "Reconfigurable Platform-Based Design in FPGAs for Video Image Processing," doctoral thesis, University of London, London, UK, 2006, 206 pages.
Shen et al., "Maximizing CNN Accelerator Efficiency Through Resource Partitioning," Jun. 30, 2016. (12 pages).
Shen, et al., "Escher: A CNN Accelerator with Flexible Buffering To Minimize Off-Chip Transfer", 2017 IEEE 25th Annual International Symposium on Field-Programmable Custom Computing Machines (FCCM), Napa, CA, 2017, pp. 93-100.
Shi et al., "A Locality Aware Convolutional Neural Networks Accelerator," *Euromicro Conference on Digital System Design*, Aug. 26-28, 2015, Funchal, Portugal, pp. 591-598.
Sim et al., "A 1.42TOPS/W Deep Convolutional Neural Network Recognition Processor for Intelligent IoE Systems," 2016 IEEE International Solid-State Circuits Conference, Jan. 31-Feb. 4, 2016, San Francisco, CA, 3 pages.
Stensland, "INF5063—GPU & CUDA," Slideshow Presentation, 2011, 44 pages.
Stenström, "Reducing Contention in Shared-Memory Multiprocessors," *Computer* 21(11):26-37, 1988.
Venieris et al., "fpgaConvNet: A Framework for Mapping Convolutional Neural Networks on FPGAs," *IEEE 24th Annual International Symposium On Field-Programmable Custom Computing Machines (FCCM)*, IEEE Computer Society, Washington DC, May 1-3, 2016, pp. 40-47.
Wang et al., "DLAU: A Scalable Deep Learning Accelerator Unit on FPGA" *IEEE Transactions on Computer-Aided Design of Integrated Circuits and Systems* 36(3):513-517, 2017.
Wang, et al., "PipeCNN: An OpenCL-Based FPGA Accelerator for Large-Scale Convolution Neuron Networks", 2017 International Conference on Field Programmable Technology (ICFPT), Melbourne, VIC, 2017, pp. 279-282.
Wu et al., "Accelerator Design for Vector Quantized Convolutional Neural Network," IEEE International Conference on Artificial Intelligence Circuits and Systems, Mar. 18-20, 2019, Hsinchu, Taiwan, pp. 46-50.
Xia et al., "Dynamic Look-up Table Method for Optimizing the Training of Deep Neural Networks on Many-Core Architecture," IEEE 7th International Conference on Computer Science and Network Technology, Oct. 19-20, 2019, Dalian, China, pp. 216-225.
Yao et al., "Hardware-Friendly Convolutional Neural Network with Even-Number Filter Size," Workshop track—ICLR 2016, 4 pages, 2016.
Yin, et al. "Parana: A Parallel Neural Architecture Considering Thermal Problem of 3D Stacked Memory", IEEE Transactions on Parallel and Distributed Systems, vol. 29, 2018, 15 pages.
Yu et al., "FPGA-based Accelerator for Convolutional Neural Network," *Computer Engineering* 43(1):109-119, 2017 (with English abstract).
Zamanidoost et al., "Low Area Overhead In-situ Training Approach for Memristor-Based Classifier," Proceedings of the 2015 IEEE/ACM International Symposium on Nanoscale Architectures (NANOARCH' 15), Jul. 8-10, 2015, Boston, Massachusetts, pp. 139-142.
Zhao et al., "Leveraging Mlc Stt-Ram for Energy-efficient CNN Training," MEMSYS '18: Proceedings of the International Symposium on Memory Systems, Oct. 2018, Alexandria, Virginia, pp. 279-290.
Zhao et al., "PIE: A Pipeline Energy-efficient Accelerator for Inference Process in Deep Neural Networks," IEEE 22nd International Conference on Parallel and Distributed Systems (ICPADS), Dec. 13-16, 2016, Wuhan, China, 8 pages.

* cited by examiner

VECTOR QUANTIZATION DECODING HARDWARE UNIT FOR REAL-TIME DYNAMIC DECOMPRESSION FOR PARAMETERS OF NEURAL NETWORKS

BACKGROUND

Technical Field

The present disclosure generally relates to convolutional neural networks implemented in sensor systems.

Description of the Related Art

Deep learning algorithms promote very high performance in numerous applications involving recognition, identification and/or classification tasks, however, such advancement may come at the price of significant requirements in terms of processing power. Thus, their adoption can be hindered by a lack of availability of low-cost and energy-efficient solutions. Accordingly, severe performance specifications may coexist with tight constraints in terms of power and energy consumption while deploying deep learning applications on embedded devices.

BRIEF SUMMARY

In one embodiment, a convolutional neural network processing system includes an input layer configured to receive input data and a decompressor unit configured to receive encoded kernel data and to generate decompressed kernel data based on the encoded kernel data. The system includes a convolutional accelerator configured to receive the decompressed kernel data, to receive feature data based on the input data, and to perform a convolution operation on the feature data and the decompressed kernel data. The system includes a fully connected layer configured to receive convolved data from the convolutional accelerator and to generate prediction data based on the convolved data.

In one embodiment, a method includes receiving encoded kernel data with a decompression unit of a convolutional neural network, wherein the encoded kernel data includes index data for a vector quantization codebook. The method includes storing the vector quantization codebook in a lookup table of the decompression unit, generating decompressed kernel data with the decompression unit by retrieving code vectors from the lookup table with the index data, and receiving feature data at a convolutional accelerator of the convolutional neural network. The method includes receiving the decompressed kernel data with the convolution accelerator from the decompression unit and performing convolution operations on the decompressed kernel data and the feature data with the convolutional accelerator.

In one embodiment, a method includes training a convolutional neural network with a machine learning process, generating, with the machine learning process, kernel data for a convolutional layer of the convolutional neural network, and generating encoded kernel data including index data and codebook data by performing a vector quantization process on the kernel data with an encoder external to the convolutional neural network. The method includes providing, during operation of the convolutional neural network after the machine learning process, the encoded kernel data to a decompression unit of the convolutional neural network. The method includes storing the vector quantization codebook in a lookup table of the decompression unit, generating decompressed kernel data with the decompression unit by retrieving code vectors from the lookup table with the index data, and providing the decompressed kernel data to the convolutional layer.

DETAILED DESCRIPTION

Figure 1:
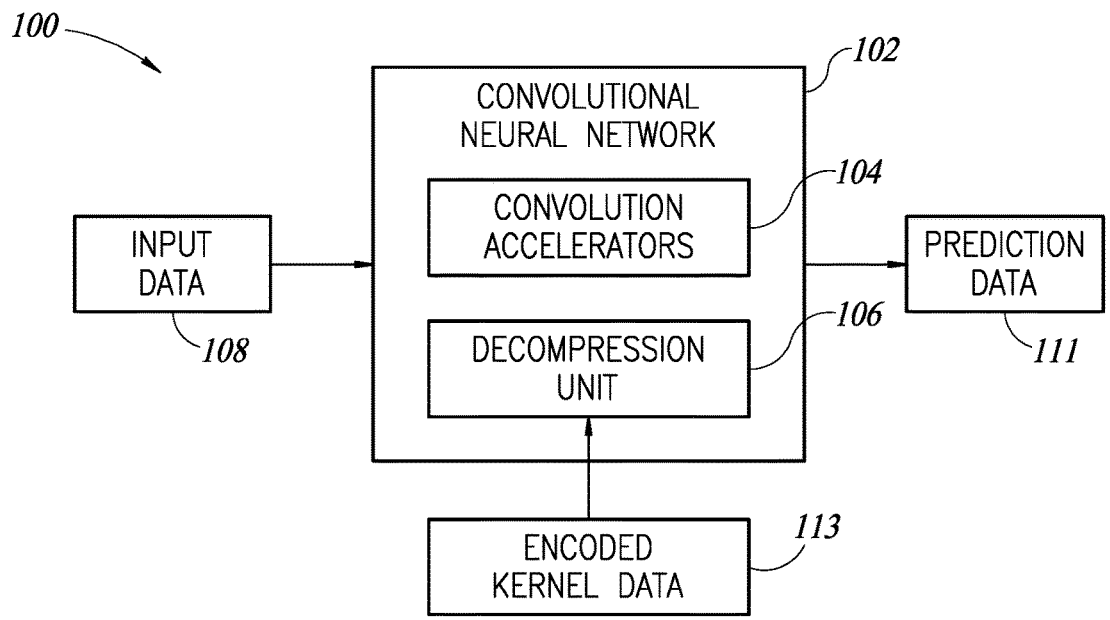
FIG. 1 is a block diagram of a portion of an electronic device, according to one embodiment.

FIG. 1 is a block diagram of an electronic device 100, according to one embodiment. The electronic device 100 includes a convolutional neural network (CNN) 102. The CNN 102 receives input data 108 and generates prediction data 111. The CNN 102 generates the prediction data 111, in part, by performing one or more convolutional operations on the input data 108.

In one embodiment, the input data 108 is provided by an image sensor (not shown) or another type of sensor of the electronic device 100. Accordingly, the input data 108 can include image data corresponding to one or more images captured by the image sensor. The image data is formatted so that it can be received by the CNN 102. The CNN 102 analyzes the image data and generates the prediction data 111. The prediction data 111 indicates a prediction or classification related to one or more aspects of the image data. The prediction data 111 can correspond to recognizing shapes, objects, faces, or other aspects of an image.

In one embodiment, the CNN 102 is trained with a machine learning process to recognize aspects of training images that are provided to the CNN 102. The machine learning process includes passing a plurality of training images with known features to the CNN. The machine learning process trains the CNN 102 to generate prediction data that accurately predicts or classifies the features of the training images. The training process can include a deep learning process.

The training process generates a plurality of kernel tensors. The kernel tensors can be considered weighting tensors. The values or weights in the kernel tensors are generated during the machine learning process such that when mathematical operations are performed between the input data 108 and the kernel tensors, accurate prediction data 111 is generated.

The decompression unit 106 augments the efficiency of the CAs 104. The decompression unit 106 receives encoded kernel data from an encoder external to the CNN 102. The decompression unit 106 decompresses the encoded kernel data 113 and provides the decompressed (or decoded) kernel data to the convolution accelerators 104 in real time during operation of the CNN 102. This augments the function of the CNN 102, as will be explained in more detail in relation to FIGS. 3 and 4.

Figure 2A:
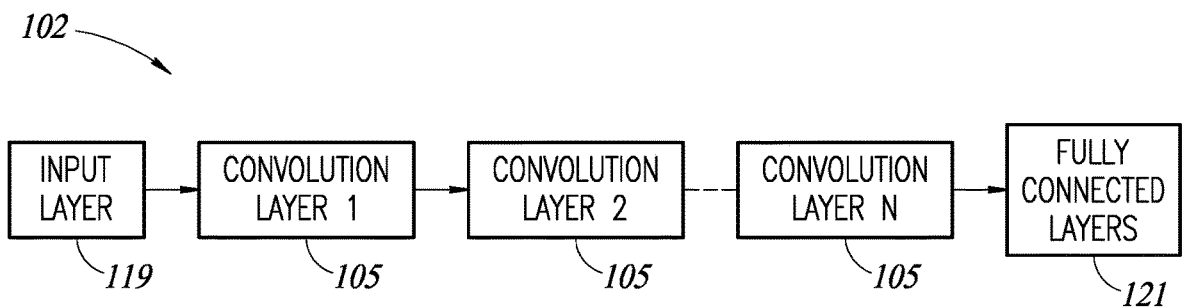
FIG. 2A is a block diagram of convolutional neural network of an electronic device, according to one embodiment.

FIG. 2A is a simplified block diagram of process flow within a CNN 102, according to one embodiment. The CNN 102 includes an input layer 119, a plurality of convolution layers 105, and one or more connected layers 121. The input data 108 is provided to the input layer 119, is passed through the various convolution layers 104, and is passed to the fully connected layers 121. The output of the final fully connected layer is the prediction data 111.

Each convolution layer 105 performs a serious of convolution operations on the input data 108, or on data generated from the input data 108 by the previous layer of the CNN 102. In particular, one or more kernel tensors are associated with each convolution layer 105. Each convolution layer 105 performs convolution operations between the kernel tensors of that convolution layer 105 and feature data provided to convolution layer 105. The feature data is derived from the input data 108. The convolution accelerators 104 perform the convolution operations associated with the convolution layers 105. Accordingly, each convolution layer 105 is associated with a respective convolution accelerator 104.

In one embodiment, the first convolution layer 105 receives feature data from the input layer 119. The feature data for the first convolution layer 105 is the input data 108. The first convolution layer 105 generates feature data from the input data 108 by performing convolution operations between the input data 108 and the kernel tensors. The first convolution layer then passes the feature data to the second convolution layer 105.

The second convolution layer receives the feature data from the first convolution layer. The second convolution layer generates feature data for the third convolution layer by performing convolution operations between the feature data generated by the first convolution layer and kernel tensors associated with the second convolution layer. The second convolution layer then passes the feature data to a convolution layer. This process repeats until the nth convolution layer has performed convolution operations on the received feature data and generated final feature data. The nth convolution layer passes the final feature data to the fully connected layers 121. The fully connected layers 121 then generate prediction data 111. The decompression unit 106 performs decompression operations on the kernel data for each convolution layer, as will be described in more detail below.

In practice, the CNN 102 includes other steps than those shown in FIG. 2A. In particular, the CNN 102 may include pooling operations, activation operations, and other operations. For example, pooling operations may be performed between the various convolution layers to prepare the feature data from one convolution layer to be processed by the next convolution layer.

Figure 2B:
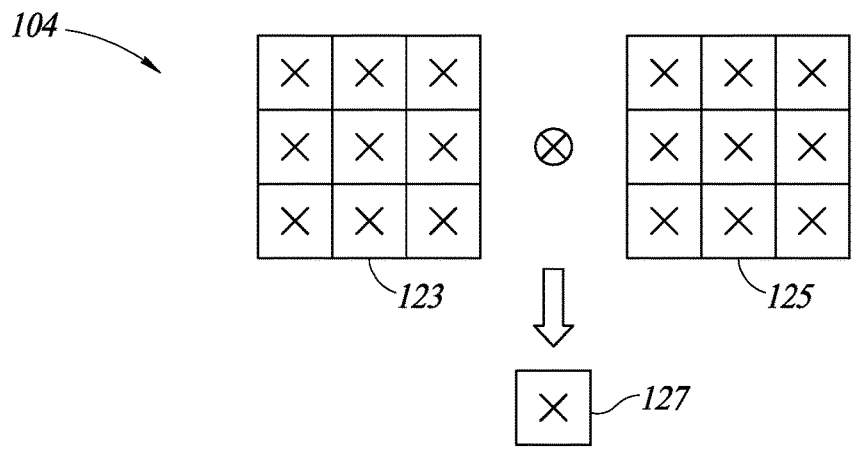
FIG. 2B is an illustration of a convolution operation, according to one embodiment.

FIG. 2B illustrates a convolution operation performed by one of the convolution layers 105. The convolution operation is performed between a feature tensor 123 and a kernel tensor 125. The convolution operation results in a feature tensor 127 for the next convolution layer. In practice, each convolution layer 105 performs convolution operations between a large number of feature tensors 123 and kernel tensors 125. In one embodiment, each convolution layer 105 performs convolution operations between a large number of sub-tensors generated from a large feature tensor 123 and a large number of sub-tensors generated from a large kernel tensor 125.

In one embodiment, the convolution operation can be decomposed into a series of multiplication and accumulate (MAC) operations. Accordingly, a key operation to consider in the convolution operation is the multiply and accumulate operation. The multiply and accumulate operation corresponds to multiplying the transpose of the kernel tensor 125 by the feature tensor 123.

In CNNs, the convolution operations may account for a majority of computing operations or computing resources expended by the CNNs. Accordingly, improving the efficiency of convolution layers can be very beneficial to CNNs. For this reason, the CNN 102 includes convolution accelerators 104 and the decompression unit 106.

Each convolution accelerator 104 corresponds to a hardware block that performs the convolution operations of a particular convolution layer 105. Accordingly, the CNN 102 includes a respective convolution accelerator 104 for each convolution layer. As will be described in more detail below, the decompression unit 106 enhances the efficiency of the CNN 102 as a whole.

The CNN 102 utilizes a quantization scheme for quantizing the kernel data associated with each convolution layer 105. The kernel data, i.e. the values for the various kernel tensors can correspond to a large amount of data. If the kernel data is stored in an uncompressed manner in the hardware block of the CNN 102, this can correspond to a large amount of memory and bandwidth usage for the CNN, and a corresponding large usage of integrated circuit area.

The CNN 102 utilizes a vector quantization technique to encode the kernel data after the machine learning process has taken place. Once the final kernel values are generated for the various convolution layers of the CNN 102 during the machine learning process, the kernel data is encoded using the vector quantization technique. In particular, an encoder maps the input range into a finite range of rational values called a codebook. Any values stored by the codebook is called a code vector. During the encoding phase, an index is associated with all of the code vectors of the codebook. In the case of vector quantization, each code vector can be formed by one or more codewords.

In the vector quantization process, the values from the multidimensional kernel tensor are encoded into a finite set of values from a discrete subspace and lower dimension. The lower space vectors require less storage space. In this way, the kernel data is effectively compressed. The encoder generates and stores an index for each lower dimension code vector.

After the CNN 102 has been trained, the CNN 102 utilizes the decompression unit 106 to assist in convolution operations. In particular, when feature data is provided to a convolution accelerator corresponding to one of the convolution layers, encoded kernel data 113 is provided to the decompression unit 106. The encoded kernel data 113 corresponds to the encoded kernel tensor values for that convolution layer. The decompression unit 106 receives the encoded kernel data 113 and decodes the encoded kernel data 113 to reproduce the original kernel data generated during the machine learning process. Accordingly, the decompression unit 106 effectively decompresses the encoded kernel data 113 and provides it to the convolution accelerator. The convolution accelerator can then utilize the decompressed kernel data to perform convolution operations on the feature data.

In one embodiment, the decompression unit 106 includes a lookup table. The lookup table includes, for each compression accelerator 104 of the CNN 102, a respective codebook. The codebook includes the codewords associated with each code vector for the corresponding kernel data. Accordingly, the decompression unit 106 simultaneously stores codebooks for each convolution accelerator 104.

In one embodiment, during operation of the CNN 102, when a convolution accelerator 104 is scheduled to perform convolution operations associated with the convolution layer 105 of the CNN 102, encoded kernel data 113 associated with that convolution layer 105 is provided to the decompression unit 106. The encoded kernel data 113 includes the indices associated with each of the code vectors in the codebook. The decompression unit 106 looks up the codewords for each index and retrieves the code vectors. The decompression unit 106 then outputs the code vectors as the decompressed kernel data. The decompressed kernel data is provided to the convolution accelerator 104. The convolution accelerator 104 then performs convolution operations on the feature data using the decompressed kernel data.

In one embodiment, the decompression unit 106 is a hardware block that consumes a relatively small amount of area. Because the codebooks represent highly compressed versions of the kernel tensors, the codebooks take up a relatively small amount of memory. The decompression unit 106 can also utilize relatively small input buffers and output buffers. Accordingly, the decompression unit 106 can be a relatively small hardware block.

Figure 3:
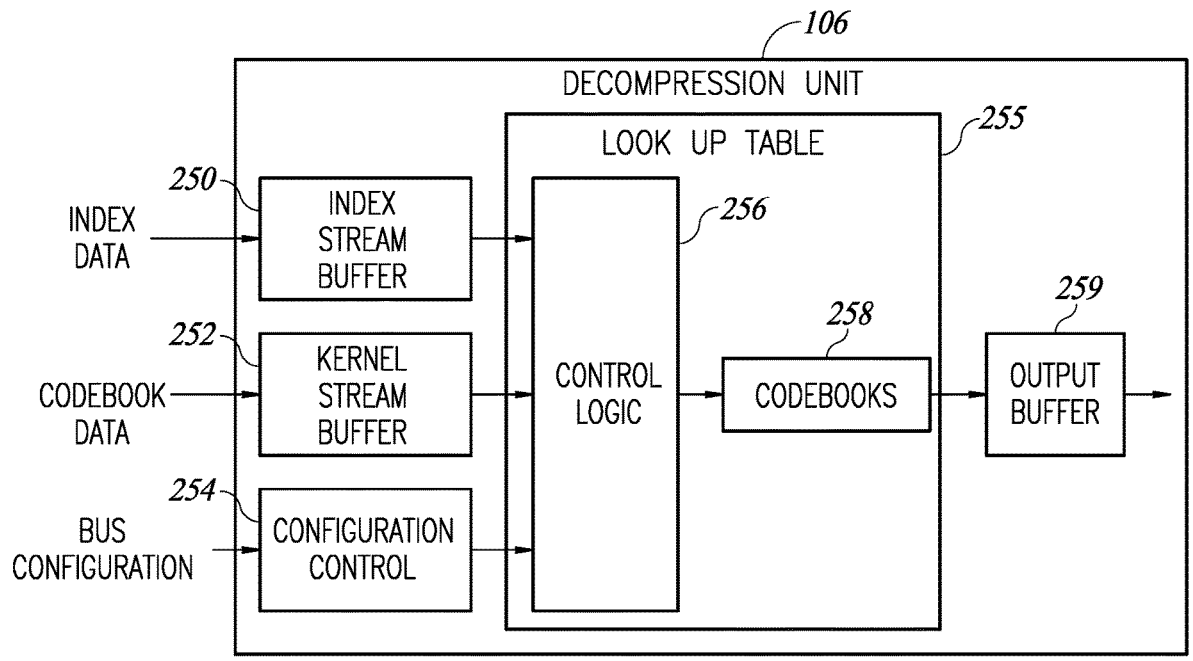
FIG. 3 is a block diagram of a decompression unit of a convolutional neural network, according to one embodiment.

FIG. 3 is a block diagram of a decompression unit 106, according to one embodiment. The decompression unit 106 includes an index stream buffer 250, a kernel stream buffer 252, a configuration control block 254, a lookup table 255, and an output stream buffer 259. The lookup table 255 includes control logic 256 and codebooks 258.

In one embodiment, the index stream buffer 250 receives index data for a convolution operation of one of the convolution accelerators 104. Accordingly, when one of the convolution accelerators 104 is to perform a convolution operation, the index data associated with the encoded kernel data is provided to the index stream buffer 250. The index data corresponds to the indices of the various codewords associated with the code vectors stored in the codebook.

In one embodiment, the index data is provided from the index stream buffer 250 to the control logic 256 of the lookup table 255. The control logic receives the indices and looks up the codewords in the codebooks 258 and retrieves the corresponding code vectors. The code vectors are then provided from the lookup stream to the output buffer 259. The output buffer 259 provides the code vectors as the decompressed kernel data to the CA 104.

In one embodiment, the codebook data is provided to the stream buffer 252 in real time when convolution is to be performed by one of the convolution accelerators. In this case, the codebook data is streamed in real time to the decompression unit 106 along with the index data. The kernel stream buffer 252 provides the codebook data to the control logic 256 which writes the codebook data to the lookup table 255. The index data is then used to lookup the codewords and associated code vectors as described previously.

In one embodiment, the decompression unit 106 receives the codebook data associated with the next two convolution operations to be performed. For example, before the first convolution accelerator 104 performs a convolution operation, the codebook data for the first and second convolution accelerators 104 are streamed to the decompression unit 106. The codebooks associated with the first and second convolution accelerators 104 are then stored in the lookup table 255. The index data for the first convolution accelerator is provided to the index stream buffer 250 and the code vectors associated with the kernel tensors for the first convolution accelerator 104 are output to the output stream buffer 259. The output stream buffer 259 then provides the decompressed kernel data to the first convolution accelerator 104. After the first convolution accelerator 104 performs its convolution operation, the codebook data associated with the third convolution accelerator is streamed to the codebook stream buffer 252 and the first codebook is replaced with the third codebook while the kernel data for the second convolution operation is lookup. In this way, the lookup table 255 contains the codebook associated with a convolution accelerator before the convolution operations of that convolution accelerator are to be performed. This helps to reduce latency in the CNN 102.

In one embodiment, the lookup table 255 has a memory sufficient to store a codebook including 256 code vectors and eight codewords per code vector. In one embodiment, each codeword is 16 bits. Thus, in one example, the lookup table 255 has a memory allocation of 32,768 bits. The lookup table 255 can include double this amount of memory in order to store two codebooks. Those of skill in the art will recognize, in light of the present disclosure, that a codebook can include different numbers of code vectors and different number of codewords per code vectors without departing from the scope of the present disclosure. Those of skill in the art will recognize, in light of the present disclosure, that the lookup table 255 can have sufficient memory to store different numbers of codebooks than those described above without departing from the scope of the present disclosure.

In one embodiment, the lookup table 255 stores the codebooks 258 at all times. In other words, the lookup table 255 includes the codebooks for each of the convolution accelerators 104. Thus, during operation of the CNN 102, only the index data is streamed to the decompression unit 106 because the decompression unit 106 already includes the codebooks 258.

In one embodiment, the configuration control 254 stores configuration data for the decompression unit 106. The decompression unit 106 can be reconfigured by writing new configuration data to the configuration control 254. In one embodiment, the control logic 256 of the lookup table 255 controls how data is written to and read from the lookup table 255.

Figure 4:
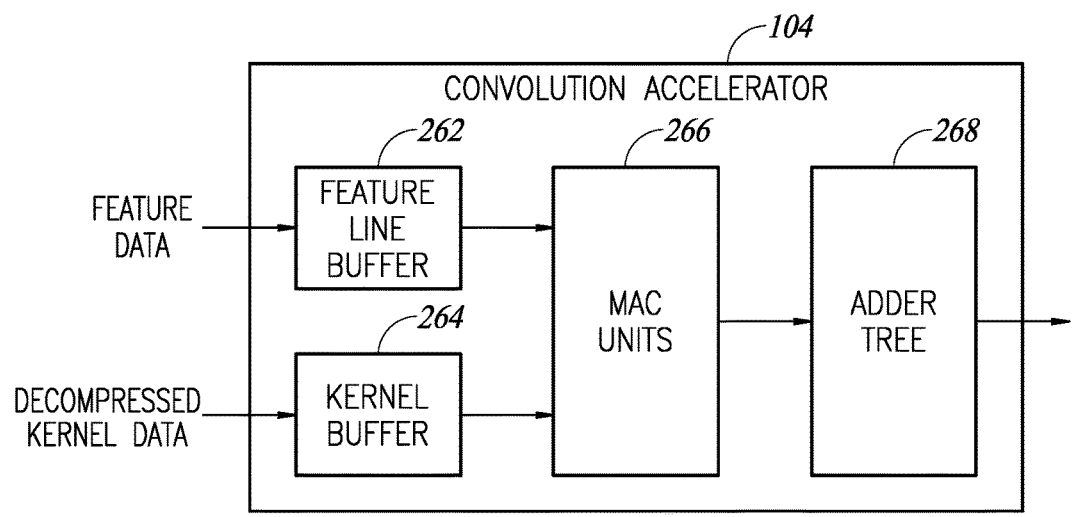
FIG. 4 is a block diagram of a convolution accelerator of a convolutional neural network, according to one embodiment.

FIG. 4 is a block diagram of a convolution accelerator 104, according to one embodiment. The convolution accelerator 104 includes a feature line buffer 262, a kernel buffer 264, MAC units 266, and an adder tree 268. The convolution accelerator 104 performs convolution operations on future data.

The feature line buffer 262 is a line buffer that receives feature data from either a prior convolution accelerator or the input stage of the CNN 102. The feature data is stored in the feature line buffer 262. The feature line buffer 262 provides the feature data to the MAC units 266.

The kernel buffer 264 receives decompressed kernel data from the decompression unit 106. The kernel buffer 264 stores the decompressed kernel data. The kernel buffer 264 provides the decompressed kernel data to the MAC units 266.

The MAC units 266 perform convolution operations between the feature data and the decompressed kernel data. In particular, the MAC units 266 perform multiplication and accumulation operations on the feature data and the decompressed kernel data. The MAC units 266 output the data to the adder tree 268. The adder tree 268 performs addition operations on the data received from the MAC units 266. The adder tree outputs feature data to the next convolution layer, or to processes intermediate to the next convolution layer, such as a pooling unit. If the convolution accelerator 104 is the final convolution accelerator, then the convolution accelerator 104 outputs the feature data to a fully connected layer.

Figure 5:
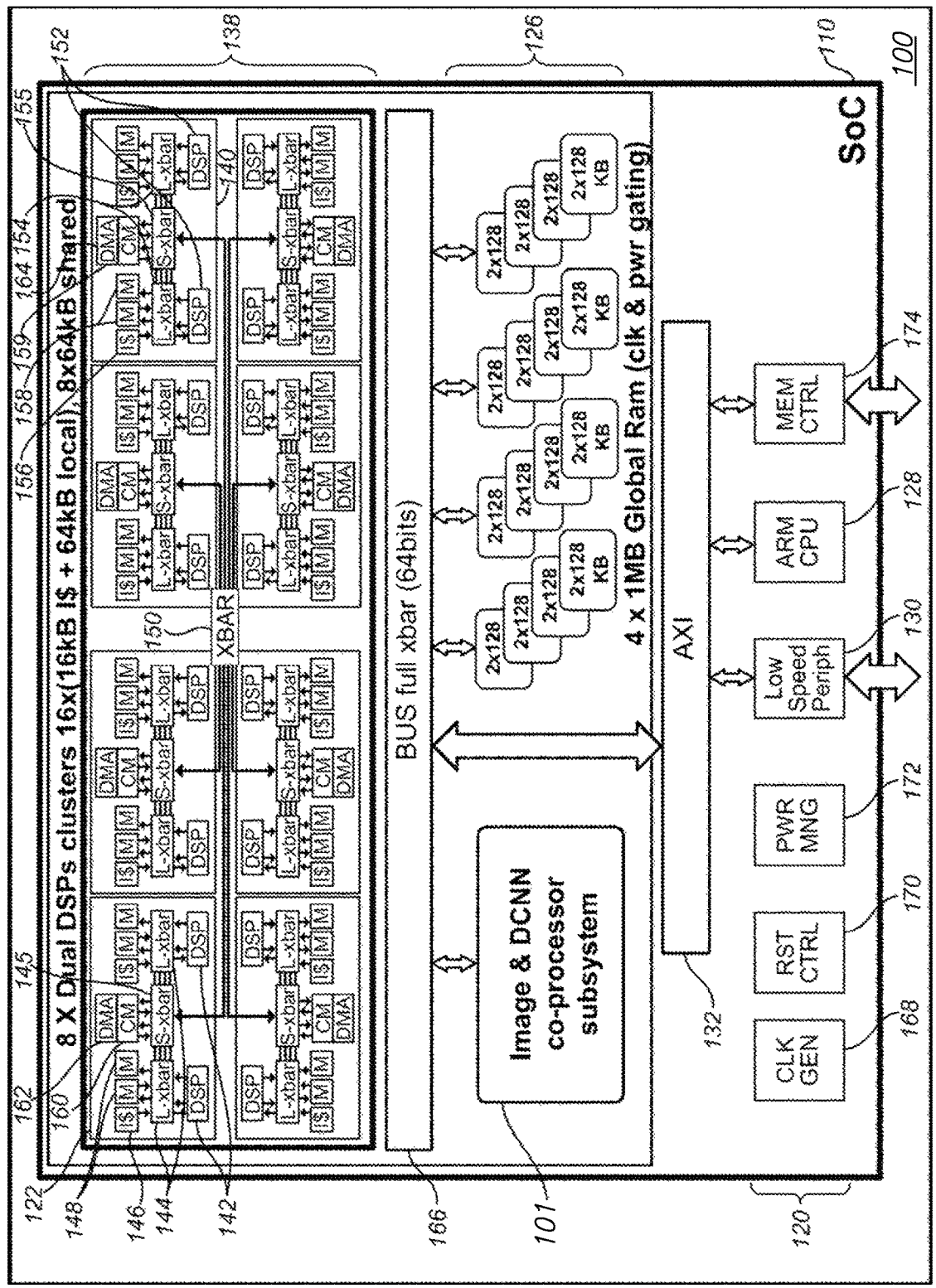
FIG. 5 is a block diagram of a system on chip of an electronic device, according to one embodiment.

FIG. 5 is a block diagram of a mobile CNN processor in a system on chip 110 of an electronic device 100, according to one embodiment. The system on chip (SoC) 110 includes an image and CNN coprocessor subsystem 101. The subsystem 101 includes a CNN 102 and image processing blocks. The subsystem 101 can receive image data from an image sensor, can process the image data, can pass the image data through the CNN 102. The CNN 102 can generate prediction data or classifications regarding the image data. In the example of FIG. 5, the mobile CNN processor is arranged as a SoC 110, however other arrangements are also contemplated (e.g., multiple chips, several chip die in a single integrated circuit, and the like). The illustrated SoC 110 includes a plurality of SoC controllers 120, the subsystem, a SoC global memory 126, an applications (e.g., a host) processor 128, and a plurality of DSPs 138, each of which are communicatively coupled, directly or indirectly, to a primary (e.g., system) communication bus 132 and a secondary communications (e.g., DSP) bus 166.

The configurable accelerator framework (subsystem) 101 is communicatively coupled to the system bus 166 which provides a mechanism for convolution accelerators of the subsystem 101 to access the SoC global memory 126 as needed and to communicate with the DSPs 138 as needed. The subsystem 101 is illustrated in more detail in FIG. 6.

The SoC 110 includes various SoC controllers 120, some of which control the SoC 110, and others of which control one or more peripheral devices. SoC controllers 120 include an applications (e.g., a host) processor 128 (e.g., an ARM processor or some other host processor), a clock generator 168 (e.g., a clock manager), a reset controller 170, and a power manager 172 to provide additional support, control, and management of various timing, power consumption, and other aspects of the SoC 110 and other components. Other SoC controllers 120 that control peripherals include a low speed peripheral I/O interface 130 and an external memory controller 174 to communicate with or otherwise access external chips, components, or memory of the exemplary device 100 in which the SoC 110 is embedded.

The applications processor 128 may act as an intermediate module or as an interface to other programs or components of the exemplary electronic device 100 with which the SoC 110 is integrated. In some embodiments, the applications processor 128 may be referred to as an applications processor core. In various embodiments, the applications processor 128 loads an SoC configuration file at boot time and configures DSPs 138 and the subsystem 101 according to the configuration file. As the SoC 110 processes one or more batches of input data (e.g., an image), the applications processor 128 may coordinate the reconfiguration of the subsystem 101 or DSPs 138 based on the configuration file, which itself may be based on the CNN layers and topology.

The SoC 110 also includes a primary communications bus 132 (e.g., an AXI—Advanced eXtensible Interface) that facilitates communications between the SoC controllers 120 and the DSPs 138 and between the SoC controllers 120 and the subsystem 101. For example, the DSPs 138 or the subsystem 101 can communicate, via the primary communications bus 132 with the applications processor 128, one or more peripheral controllers/peripheral communications interface (low speed peripheral I/O) 130 an external memory (not shown) via an external memory controller 174, or other components. The SoC controllers 120 may also include other supporting and cooperative devices such as a clock manager (e.g., a clock generator) 168, a reset controller 170, a power manager 172 to provide additional timing and power management to the SoC 110, and other components.

In some embodiments, and as illustrated in FIG. 5, the plurality of DSPs 138 are arranged in a plurality of DSP clusters, such as a first DSP cluster 122, a second DSP cluster 140, and several other DSP clusters that are not referenced for simplification of the illustration. Each DSP cluster 122, 140 includes a plurality (e.g., two) of DSPs 142, 152, a plurality (e.g., two) of local DSP crossbar switches 144, 154, and a DSP cluster crossbar switch 145, 155. Each DSP 142, 152 in a particular cluster is capable of communicating with other DSP's 142, 152 via the DSP cluster crossbar switch 145, 155. Each DSP 142, 152 has access to a corresponding instruction cache 146, 156, and local DSP memory 148, 158 via its corresponding local DSP crossbar switch 144, 154. In one non-limiting embodiment, each instruction cache 146, 156 is a 4-way 16 kB instruction cache and each local DSP memory 148, 158 is 64 kB of local RAM storage for its corresponding DSP. Each DSP cluster 122, 140 also includes a shared DSP cluster memory 160, 159 and a cluster DNA 162, 164 for accessing the SoC global memory 160, 159.

Each DSP cluster 122, 140 is communicatively coupled to a global DSP cluster crossbar switch 150 via the DSP cluster crossbar switch 145, 155 to enable each DSP 142, 152 in each DSP cluster 122, 140 to communicate with one another and other components on the SoC 110. The global DSP cluster crossbar switch 150 enables each DSP to communicate with other DSPs in the plurality of DSP clusters 138.

Additionally, the global DSP cluster crossbar switch 150 is communicatively coupled to a system bus 166 (e.g., secondary communications bus, xbar—SoC crossbar switch, or the like), which enables each DSP to communicate with other components of the SoC 110. For example, each DSP 142, 152 can communicate with one or more components (e.g., one or more convolution accelerators) of the subsystem 101 or access an SoC global memory 126 via the system bus 166. In some embodiments, each DSP 142, 152 can communicate with the SoC memory 126 via the DMA 162, 164 of its corresponding DSP cluster 122, 140. Moreover, DSP 142, 152 may communicate with the controllers 120 or other modules of the SoC 110 as needed via the system bus 166. Each DSP accesses the system bus 166 via its local DSP crossbar switch 144, 154, its DSP cluster crossbar switch 145, 155, and the global DSP duster crossbar switch 150.

The plurality of DSPs 136 can be assigned or allocated to perform specific instructions to accelerate other operations of the CNN. These other operations may include non-convolutional operations performed during a CNN process, which are in some cases primarily performed by the subsystem 101. Examples of these non-convolutional operations include, but are not limited to, max or average pooling, nonlinear activation, cross-channel response normalization, classification representing a small fraction of the total CNN computation but more amenable to future algorithmic evolutions, or other operations, e.g., Min, Max, Sqrt, MAC, Butterfly, Average, 2-4 SIMD ALU. In some cases, operations that previously have been performed using one or more of the DSPs 138 are now performed using the arithmetic unit for deep learning acceleration structures. Accordingly, improved operations of the processors and their associated computing devices described herein may be realized by the arithmetic unit structures described herein.

DSPs 138 can operate concurrently (e.g., in parallel) with the operations of CA's 104 in the subsystem 101 and concurrently (e.g., in parallel) with data transfers, which may be synchronized by way of interrupts, mailboxes, or some other synchronization mechanism for concurrent execution.

In various embodiments, the SoC memory 126 includes a plurality of memory components for storing data that is accessible to the components of the subsystem 101 or the DSPs 138. In at least one embodiment, the SoC memory 126 is configured in a hierarchical-type memory structure. In one non-limiting example, the SoC memory 126 includes four SRAM banks each with 1 Mbyte of storage space.

As described herein, the subsystem 101 includes a reconfigurable dataflow accelerator fabric connecting high-speed camera interfaces with any one or more of arithmetic units for deep learning acceleration, sensor processing pipelines, croppers, color converters, feature detectors, video encoders, eight channel digital microphone interface, streaming DMAs and a plurality of convolution accelerators.

The subsystem 101 receives incoming data (e.g., image data in FIG. 6, but other types of streaming data in different embodiments), such as from the camera interface, or other sensors, and distributes the incoming data to the various components of the subsystem 101 (e.g., convolution accelerators 104, pooling unit 226, decompression unit 106, activation units 228, and the like) and/or one or more of the plurality of DSPs 138 to employ the CNN and recognize objects in the incoming images.

The subsystem 101 utilizes unidirectional links to transport data streams via a configurable, fully connected switch to or from different kinds of source or sink components. For example, the configurable fully connected switch can transport data via direct memory accesses (DMAs) to the SoC global memory 126, I/O interfaces (e.g., cameras), and various types of accelerators such as CAs 104 and activation units 228. In some cases, the subsystem 101 is configured at boot time based on information received from a particular SoC configuration tool, and the subsystem 101 is re-configured during run time based on defined CNN layers and topology or information received from one or more DSPs 138, applications processor 128, or the like.

The subsystem 101 allows for the definition of a selectable number of concurrent, virtual processing chains at run time. The subsystem 101 also includes a full featured back pressure mechanism to control data flow to the various components of the framework. The subsystem 101 is arranged for stream multicasting operations, which enable the reuse of a data stream at multiple block instances. Linked lists control the fully autonomous processing of an entire convolution layer. Multiple accelerators, grouped or chained together, handle varying sizes for feature maps data and multiple kernels in parallel. Grouping the convolutional accelerators (CA's) 104 to achieve larger computational entities enables choosing an acceptably optimal balancing of the available data bandwidth, budget power, and available processing resources. Each CA 104 includes a line buffer to fetch up to a predetermined number (e.g., 12) of feature map data words in parallel with a single memory access. Further supporting the CA 104 structures are the activation units 228, which perform math functions according to a second order polynomial approximation.

Rather than passing data for specific activation functions out of the subsystem 101 to a separate device such as a DSP, data is retained within the subsystem 101 architecture thereby achieving significant speed and data throughput gains. In each CA (104), a register-based kernel buffer provides multiple read ports (e.g., 36 read ports), while multiple fixed-point multiply-accumulate (MAC) units (e.g., 36 16-bit MAC units) perform multiple MAC operations per clock cycle (e.g., up to 36 operations per clock cycle). An adder tree accumulates NAC results for each kernel column. The overlapping, column based calculation of the MAC operations allows an acceptably optimal reuse of the feature maps data for multiple MACs, thereby reducing power consumption associated with redundant memory accesses.

Kernel sets are partitioned in batches processed sequentially and intermediate results can be stored in the SoC global memory 126. Various kernel sizes (e.g., up to 12×12), various batch sizes (e.g., up to 16), and parallel kernels (e.g., up to 4) can be handled by a single CA 104 instance but any size kernel can be accommodated with the accumulator input.

The configurable batch size and a variable number of parallel kernels enable acceptably optimal trade-offs for the available input and output bandwidth sharing across different units and the available computing logic resources.

A different acceptably optimal configuration of CA's 104 in the subsystem 101 is determined for each CNN layer. These configurations may be determined or adjusted using a holistic tool that starts with a CNN description format, such as Caffe' or TensorFlow. The CA 104 receives decompressed kernel data from the decompression unit 106.

The subsystem 101 may be configured for image processing, audio processing, prediction analysis (e.g., games of skill, marketing data, crowd behavior prediction, weather analysis and prediction, genetic mapping, disease diagnosis, and other scientific, commercial, consumer, and such processing) or some other type of processing; particularly processing that includes convolutional operations.

The subsystem 101 is also arranged with a number of configurable modules. A stream switch 202 provides a design time parametric, run-time reconfigurable accelerator interconnect framework to support data-flow based processing chains. The subsystem 101 includes a set of subsystem control registers 204. The subsystem 101 includes a system bus interface module 230, a selected number of DMA engines 232 (e.g., DMA controllers), a selected number of external device 216, 218, 220, a selected number of processing modules 210, 212, 214, a selected number of convolution accelerators (CAs) 104 and a selected number of activation function accelerators 228 (e.g., 1, 2, 4, 8, or another number).

The stream switch 202 is a reconfigurable unidirectional interconnection structure formed with a plurality of unidirectional "stream links." The stream links are arranged to transport multibit data streams from accelerators, interfaces, and other logic modules to the stream switch 202 and from the stream switch 202 to accelerators, interfaces, and other logic modules.

In addition to the stream switch 202, the subsystem 101 may also include a system bus interface module 230. The system bus interface module 230 provides an interface to other modules of SoC 110. As shown in the exemplary embodiment of FIG. 5, the subsystem 101 is coupled to the secondary communication bus 166. In other cases, the subsystem 101 may be coupled to the primary communication bus 132 or some other communication mechanism. Control information may be passed unidirectionally or bidirectionally through the system bus interface module 230 of the subsystem 101. Such interface is used to provide a host processor (e.g., DSP of DSP cluster 130, applications processor 128, or another processor) access to all of the subsystem control registers 204, which are used to control, operate, or otherwise direct particular features of the framework. In some embodiments, each DMA engine 232, external device interface 216, 218, 220, processing module 208, 210, 212, convolution accelerator 104, and activation function accelerators 228 has an interface to the configuration network with a defined set of configuration registers (e.g., formed in subsystem control registers 204).

Figure 6:
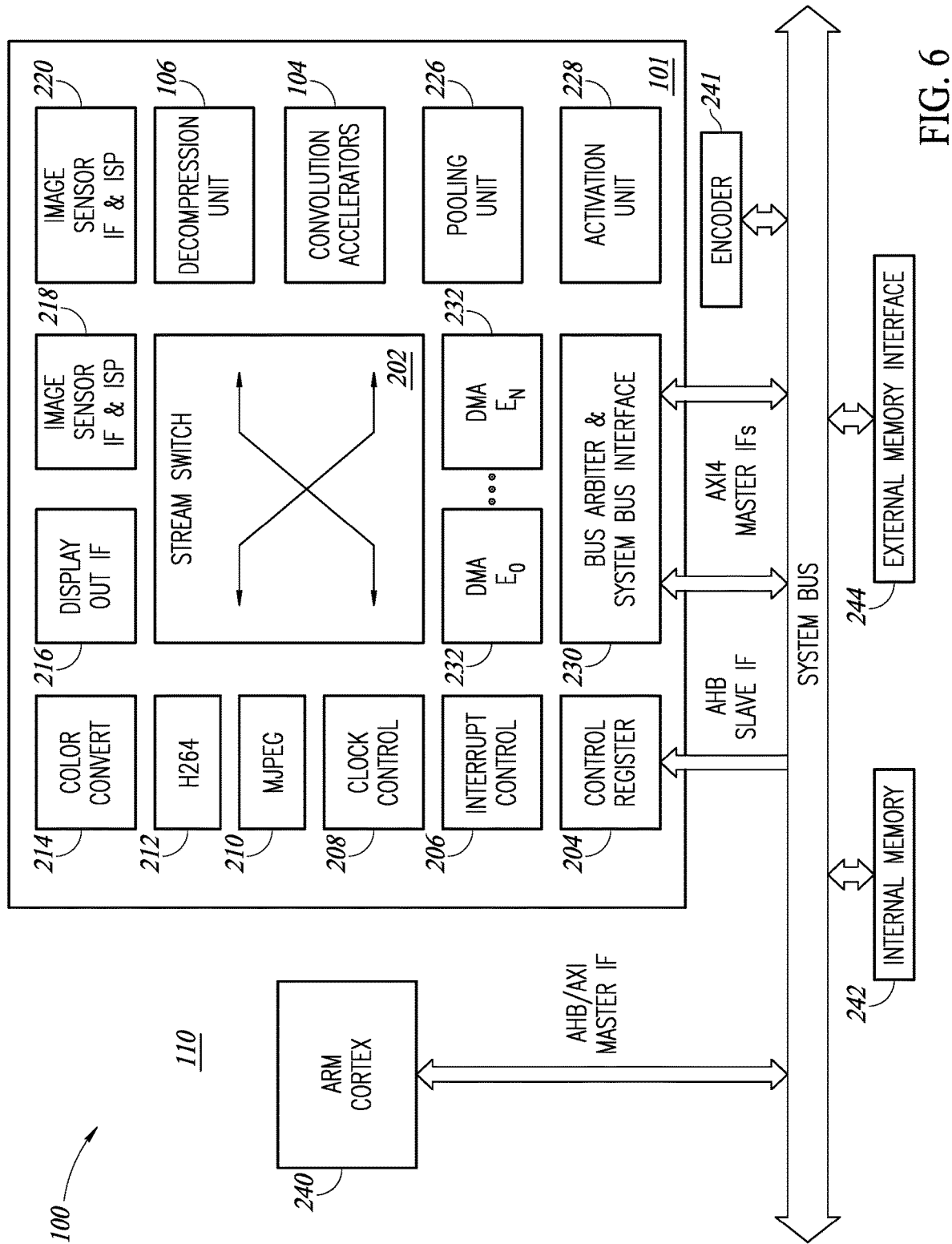
FIG. 6 is a block diagram of an image and convolutional neural network processing subsystem, according to one embodiment.

The subsystem 101 includes a plurality of DMA engines 232. In FIG. 6, sixteen DMA engines 232 are illustrated, but some other number of DMA engines may be included in other embodiments of SoC 110 according to one or more choices made by a semiconductor practitioner at design time. The DMA engines 232 are arranged to provide bidirectional channels for input data flow, output data flow, or input and output data flow. In these cases, substantial quantities of data are passed into the subsystem 101, out from the subsystem 101, or into and out from the subsystem 101. For example, in some cases, one or more DMA engines 23 are used to pass streaming video data from memory or from a data source device (e.g., a high-definition (HD) video camera) that produces substantial quantities of video data. Some or all of the video may be passed in from the source device, in from or out to SoC global memory 126, and the like.

In one exemplary embodiment, one or more DMA engines 232 are connected to the stream switch 202 with one input port and one output stream port. The DMA engines 232 can be configured in either input or output mode. The DMA engines 232 can be configured to pack and send data to any address location accessible on the primary communication bus 132, the secondary communication bus 166, or some other address location. The DMA engines 232 can also additionally or alternatively be configured to unpack fetched data and translate the unpacked data into a data stream.

The subsystem 101 of FIG. 6 includes a design-time selectable, run-time configurable plurality of external device 216, 218, 220. The external device 216, 218, 220 provide a connection to external devices which produce (i.e., source devices) or consume (i.e., sink devices) data. In some cases, the data that passes through an external device interface 244 includes streaming data. The amount of streaming data that is passed through an external device interface may be predetermined in some cases. Alternatively, the amount of streaming data passed through an external device interface may be indeterminate, and in such cases, the external device may simply produce or consume data whenever the particular external device is enabled and so directed. External devices coupled through the external device 216, 218, 220 may include image sensors, digital microphones, display monitors, or other source and sink devices. In FIG. 6, external device interface includes a digital visual interface (DVI) external device interface, a first image sensor interface and image signal processor (ISP) external device interface 218, and a second image sensor interface and ISP external device interface 220. Other interfaces are also contemplated, though for simplicity in illustration, only three external device 216, 218, 220 are shown.

A plurality of processing modules 210, 212, 214 are integrated in the subsystem 101. Three processing modules 210, 212, 214 are illustrated for simplicity, but another selected number (e.g., two, four, eight, sixteen) of processing modules 210, 212, 214 may also be integrated in a subsystem 101 at design time by a semiconductor practitioner. An MPEG/JPEG processing module 210 is arranged to perform certain video (i.e., MPEG) processing and certain image (i.e., JPEG) processing. An H264 processing module 212 is arranged to perform particular video encoding/decoding operations. An color converter processing module 214 is arranged to perform color-based operations on certain multimedia data.

In many cases, the DMA controllers 232, the external device 216, 218, 220, the processing modules 210, 212, 214, the convolution accelerators 104, the activation function accelerators 228, and other modules integrated in a subsystem 101 are IP modules selected from a library by a semiconductor practitioner at design time. The semiconductor practitioner may specify the number of modules, features of particular modules, bus widths, power parameters, layout, memory availability, bus access, and many other parameters.

In the configurable accelerator framework (subsystem) 101 of FIG. 6, a plurality of convolution accelerators 104 are represented. Different numbers of CAs can be provided in different embodiments. The number of convolution accelerators 104 and the particular features available in each convolution accelerator 104 are in some cases based on parameter values selected by a semiconductor practitioner at design time.

The CAs 104 are data processing units with a selected number (e.g., one, two, four, eight) of input and output stream link ports. One or more configuration registers (e.g., a set of configuration registers) are arranged to control operations of the CA 104. In some cases, configuration registers are included in the subsystem control registers 204, and in these or other cases, certain configuration registers are formed as part of the CA 104.

Typically, each CA 104 either consumes data, generates data, or both consumes data and generates data. Data that is consumed passes through a first stream link of the reconfigurable stream switch 202, and data that is streamed passes through a second stream link of the stream switch 202. In at least some embodiments, CAs have no direct access to memory address space accessible by the primary communications bus 132, the secondary communications bus 166, or other bus addresses. However, if random memory access to data passed on a system bus is required, a CA 104 may also use an optional bus port interface, which may be along the lines of the system bus interface module 230, which is used for several things including permitting DMA engines to access memory locations on the system bus. As discussed above, some CA 104 implementations are part of a library, which can be used in other subsystem 101 embodiments to simply instantiate the CA 104 in a global system definition file.

One or more activation function accelerator template modules may also be included in the IP modules library. Here, the predefined set of configuration registers can be further extended to provide parameter storage for configuration of the included arithmetic units. The parameters are associated with configuration of any desirable number of multiplexor circuits, multiplier circuits, adder circuits, temporary storage circuits, data shift circuits, and other circuits.

Each activation function accelerator 228 is dedicated to performing execution of an activation function represented in the form of a piece-wise second order polynomial approximation such as the formula in Equation 1. Scalar data, vector data, streaming data, constant data, interleaved data, and any other desirable data available within the subsystem 101 framework may be passed into the activation function accelerators 228 as operands, and generated resultant data will be passed out from the respective accelerator. The data passed into the activation function accelerators 228 may be sourced from a reconfigurable stream switch 202, a memory inside or outside of the subsystem 101 framework, a sensor or particular interface, or from some other source. Along these lines, each of these types of data sources may, in some cases, consume the data generated in the accelerator unit. As discussed herein, some activation function accelerator 228 implementations are part of a library, which can be used in other subsystem 101 embodiments to simply instantiate the accelerator unit in a global system definition file.

System level programmers of machine learning systems desire flexibility to choose a desirable programming model for their particular implementation. To support this high level of flexibility, the subsystem 101 is arranged with a reconfigurable stream switch 202. As described in the present disclosure, the stream switch 202 acts as a data transfer fabric to improve logic block (IP) reuse, data reuse, and the reuse of other components and logic, which in turn allows a reduction of on-chip and off-chip memory traffic, and which provides a much greater flexibility to leverage the same logic blocks in different application use cases. Integrated in the stream switch 202 is a plurality of unidirectional links arranged to transport data streams via a configurable fully connected switch to, from, and to and from different kinds of data sources, data sinks, and data sources and data sinks such as direct memory access (DMA) controllers, I/O interfaces (e.g., cameras), and various types of accelerators.

The transported data may take any desired format such as a stream of raster scan image frames, a stream of macroblock oriented images, audio streams, raw data blocks, a stream of input or output activation function values, or any other format. The stream switch 202 can also transport messages, commands, or other like control information along a processing chain forwarded by each unit to one or more or more targeted units where the control information is processed. The control information may be used to signal events, to reconfigure the processing chain itself, or to direct other operations.

The subsystem 101 is communicably connected to an ARM Cortex 240, an internal memory 242, and external memory interface 244, and an encoder 241 by a system bus. Alternatively, the encoder 241 may be external to the SoC 110.

Figure 7:
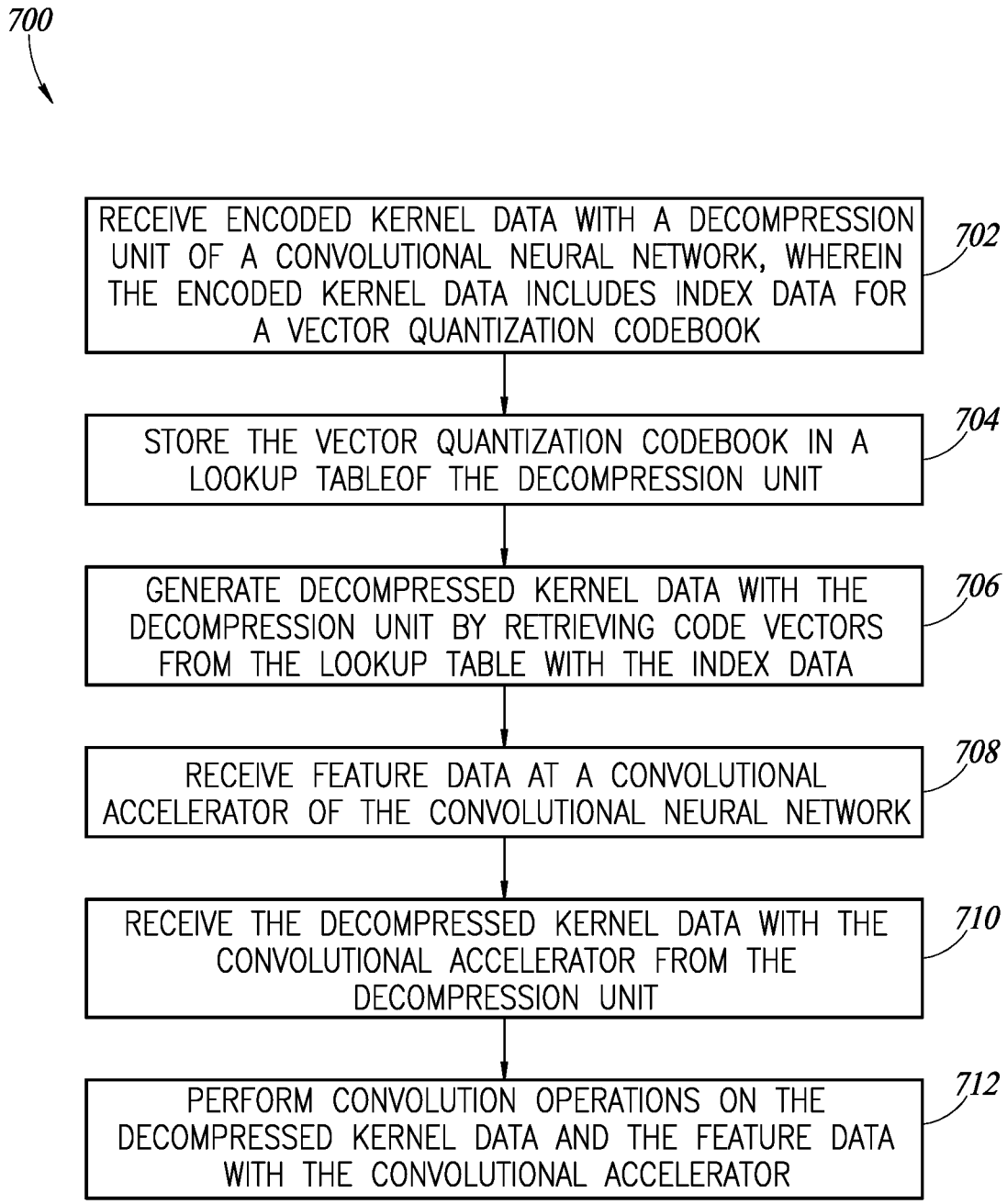
FIG. 7 is a flow diagram of a method, according to one embodiment.

FIG. 7 is flow diagram off method 700, according to one embodiment. At 702, the method 700 includes receiving encoded kernel data with a decompression unit of a convolutional neural network, wherein the encoded kernel data includes index data for a vector quantization codebook. At 704, the method 700 includes storing the vector quantization codebook in a lookup table of the decompression unit. At 706, the method 700 includes generating decompressed kernel data with the decompression unit by retrieving code vectors from the lookup table with the index data. At 708, the method 700 includes receiving feature data at a convolutional accelerator of the convolutional neural network. At 710, the method 700 includes receiving the decompressed kernel data with the convolution accelerator from the decompression unit. At 712, the method 700 includes performing convolution operations on the decompressed kernel data and the feature data with the convolutional accelerator.

Figure 8:
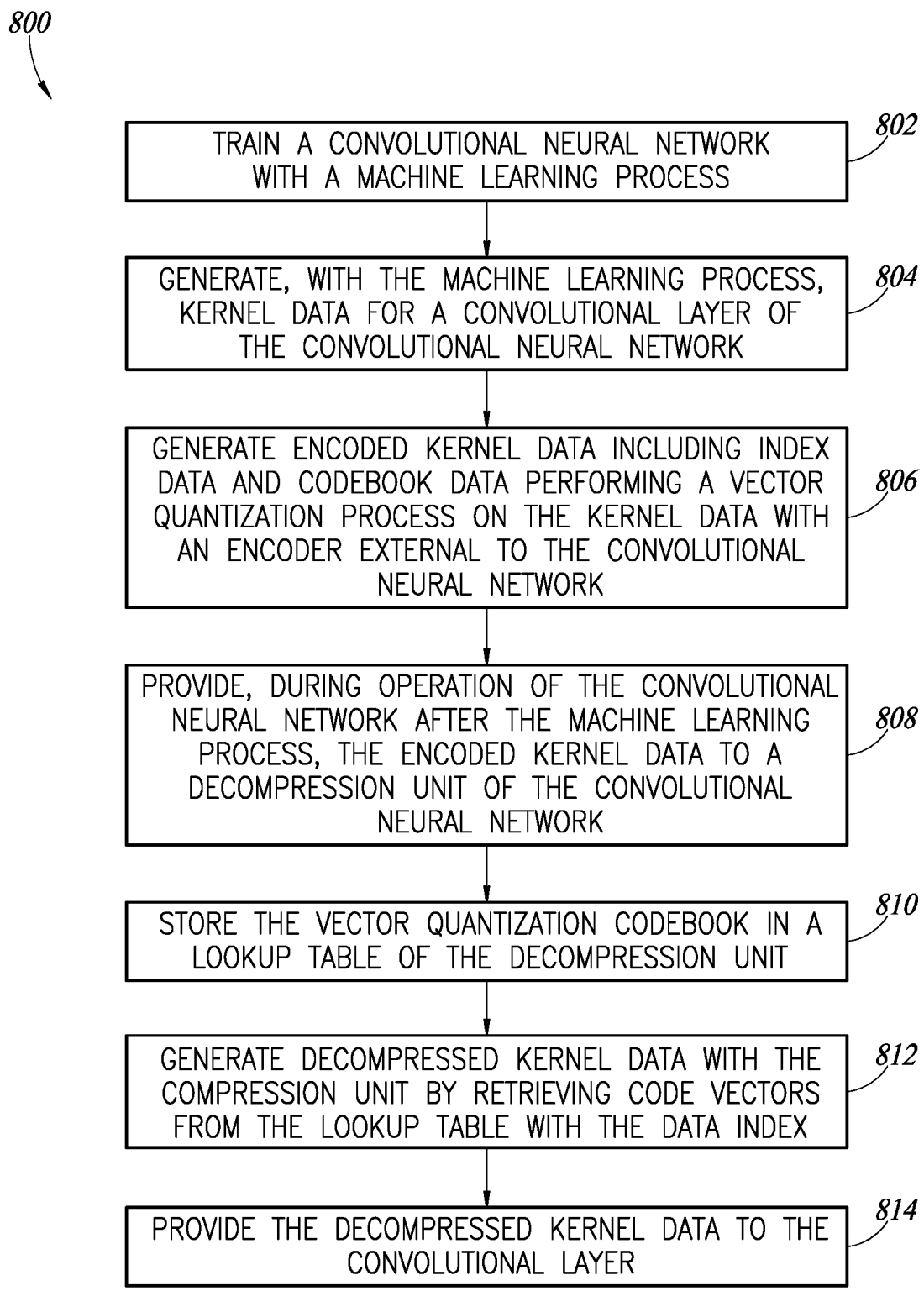
FIG. 8 is a flow diagram of a method, according to one embodiment.

FIG. 8 is flow diagram of a method 800, according to one embodiment. At 802, the method 800 includes training a convolutional neural network with a machine learning process. At 804, the method 800 includes generating, with the machine learning process, kernel data for a convolutional layer of the convolutional neural network. At 806, the method 800 includes generating encoded kernel data including index data and codebook data by performing a vector quantization process on the kernel data with an encoder external to the convolutional neural network. At 808, the method 800 includes providing, during operation of the convolutional neural network after the machine learning process, the encoded kernel data to a decompression unit of the convolutional neural network. At 810, the method 800 includes storing the vector quantization codebook in a lookup table of the decompression unit. At 812, the method 800 includes generating decompressed kernel data with the decompression unit by retrieving code vectors from the lookup table with the index data. At 814, the method 800 includes providing the decompressed kernel data to the convolutional layer.

Further details related to electronic devices implementing convolutional neural networks can be found in U.S. Patent Application Publication 2019/0266479, filed Feb. 20, 2019, in U.S. Patent Application Publication No. 2019/0266485, filed Feb. 20, 2019, and in U.S. Patent Application Publication No. 20190266784, filed Feb. 20, 2019, each of which are incorporated herein by reference in their entireties.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    training a convolutional neural network with a machine learning process;
    generating, with the machine learning process, kernel data for a convolutional layer of the convolutional neural network;
    generating encoded kernel data including index data and codebook data by performing a vector quantization process on the kernel data with an encoder external to the convolutional neural network;
    providing, during operation of the convolutional neural network after the machine learning process, the encoded kernel data to a decompression unit of the convolutional neural network;
    storing a vector quantization codebook in a lookup table of the decompression unit;
    generating decompressed kernel data with the decompression unit by retrieving code vectors from the lookup table with the index data; and
    providing the decompressed kernel data to the convolutional layer.

2. The method of claim 1, further comprising:
    receiving feature data at a convolutional accelerator of the convolutional neural network; and
    performing convolution operations on the decompressed kernel data and the feature data with the convolutional accelerator.

3. The method of claim 2, further comprising generating prediction data with the convolutional neural network based on the feature data and the decompressed kernel data.

4. The method of claim 3, wherein the feature data is generated from image data from an image sensor.

5. The method of claim 1, wherein the decompression unit includes an index stream buffer, wherein the encoded kernel data includes index data for retrieving code vectors from the lookup table.

6. The method of claim 4, comprising:
receiving, with the decompression unit, the codebook data, wherein the encoded kernel data includes the codebook data;
storing, with the decompression unit, the codebook data in the lookup table;
receiving, with the decompression unit, the index data; and
retrieving, with the decompression unit, the code vectors from the codebook data with the index data.

7. The method of claim 1, further comprising storing, with the decompression unit, codebook data for multiple convolution accelerators simultaneously.

8. The method of claim 3, wherein the feature data is image data from an image sensor.

9. The method of claim 8, wherein the prediction data identifies features in the image data.

10. The method of claim 1, comprising implementing the convolutional neural network with multiple convolutional accelerators defining multiple convolution layers of the convolutional neural network.

11. A convolutional neural network processing system, comprising:
an input layer configured to receive input data;
a decompressor unit configured to receive encoded kernel data encoded with a vector quantization process and to generate decompressed kernel data based on the encoded kernel data, wherein the decompressor unit includes a lookup table configured to store codebook data associated with the encoded kernel data;
a first convolutional accelerator and a second convolutional accelerator each configured to receive the decompressed kernel data, to receive feature data based on the input data, and to perform a convolution operations on the feature data and the decompressed kernel data, wherein the first convolutional accelerator defines a first convolutional layer of the convolutional neural network, wherein the second convolutional accelerator defines a second convolutional layer of the convolutional neural network, wherein the first and second convolutional layers are trained with a machine learning process that generates kernel data, wherein the encoded kernel data is generated from the kernel data; and
a fully connected layer configured to receive convolved data from the convolutional accelerator and to generate prediction data based on the convolved data.

12. The system of claim 11, wherein the decompressor unit includes an index stream buffer, wherein the encoded kernel data includes index data for retrieving code vectors from the lookup table.

13. The system of claim 12, wherein the decompressor unit generates the decompressed kernel data by retrieving code vectors from the lookup table based on the index data.

14. The system of claim 13, wherein the encoded kernel data includes the codebook data, wherein the decompressor unit is configured to receive the codebook data, store the codebook data in the lookup table, receive the index data, and retrieve the code vectors from the codebook data with the index data.

15. The system of claim 12, wherein the codebook data and the index data are generated with the vector quantization process.

16. The system of claim 11, further comprising multiple convolution accelerators, wherein the decompressor unit is configured to store codebook data for the multiple convolution accelerators simultaneously.

17. A method, comprising:
training a convolutional neural network with a machine learning process;
generating, with the machine learning process, kernel data for a convolutional layer of the convolutional neural network;
generating encoded kernel data including index data and codebook data by performing a vector quantization process on the kernel data with an encoder external to the convolutional neural network;
receiving the encoded kernel data with a decompression unit of the convolutional neural network, wherein the encoded kernel data includes index data for a vector quantization codebook;
storing the vector quantization codebook in a lookup table of the decompression unit;
generating decompressed kernel data with the decompression unit by retrieving code vectors from the lookup table with the index data;
receiving feature data at a convolutional accelerator of the convolutional neural network;
receiving the decompressed kernel data with the convolution accelerator from the decompression unit; and
performing convolution operations on the decompressed kernel data and the feature data with the convolutional accelerator.

18. The method of claim 17, wherein the convolutional neural network is implemented on a system on chip, wherein receiving the encoded kernel data includes receiving the encoded kernel data from a source external to the system on chip.

19. The method of claim 17 wherein the encoded kernel data includes second codebook data for a second convolutional accelerator of the convolutional neural network, the method comprising:
storing the second vector quantization codebook data in the lookup table of the decompression unit;
receiving second index data in the encoded kernel data;
generating second decompressed kernel data by retrieving code vectors from the second vector quantization codebook with the second index data; and providing the second decompressed kernel data to the second convolutional accelerator.

20. The method of claim 17, further comprising:
receiving feature data at the convolutional accelerator; and
performing convolution operations on the decompressed kernel data and the feature data with the convolutional accelerator.

* * * * *